United States Patent [19]
Golynsky

[11] Patent Number: 5,370,445
[45] Date of Patent: Dec. 6, 1994

[54] CHAIR CONTROL

[75] Inventor: Arkady Golynsky, Allentown, Pa.

[73] Assignee: Westinghouse Electric Corporation, Pittsburgh, Pa.

[21] Appl. No.: 75,070

[22] Filed: Jun. 10, 1993

[51] Int. Cl.⁵ .............................................. A47C 1/02
[52] U.S. Cl. .................................... 297/326; 297/302; 297/304
[58] Field of Search ................ 297/285, 300–304, 297/325–328

[56] References Cited

U.S. PATENT DOCUMENTS

| | | | |
|---|---|---|---|
| 3,740,792 | 6/1973 | Werner | 297/304 X |
| 4,195,372 | 4/1980 | Farina | 4/234 |
| 4,575,150 | 3/1986 | Smith | 297/301 X |
| 4,776,633 | 10/1988 | Knoblock et al. | 297/301 X |
| 4,818,019 | 4/1989 | Mrotz, III | 297/303 |
| 4,865,384 | 9/1989 | Desanta | 297/304 |
| 4,889,385 | 12/1989 | Chadwick et al. | 297/302 |
| 5,029,940 | 7/1991 | Golynsky et al. | 297/302 X |
| 5,224,758 | 7/1993 | Takamatsu et al. | 297/302 X |
| 5,238,294 | 8/1993 | Ishi et al. | 297/301 |

*Primary Examiner*—Kenneth J. Dorner
*Assistant Examiner*—Milton Nelson, Jr.

[57] ABSTRACT

Disclosed is knee tilt chair control mechanism for a pedestal base chair having a chair control housing mounted on the pedestal chair base and pivotally supporting a chair seat support member having a cam surface formed along a portion of the bottom surface thereof. A torsion spring is secured to the chair control housing and is adapted to resist the pivotal movement of the chair seat support member. The torsion spring has a lever arm adapted to move along the cam surface during the pivotal movement of the chair seat support member and thereby make a more effective use of the torsion spring and a chair more comfortable to the user.

5 Claims, 5 Drawing Sheets

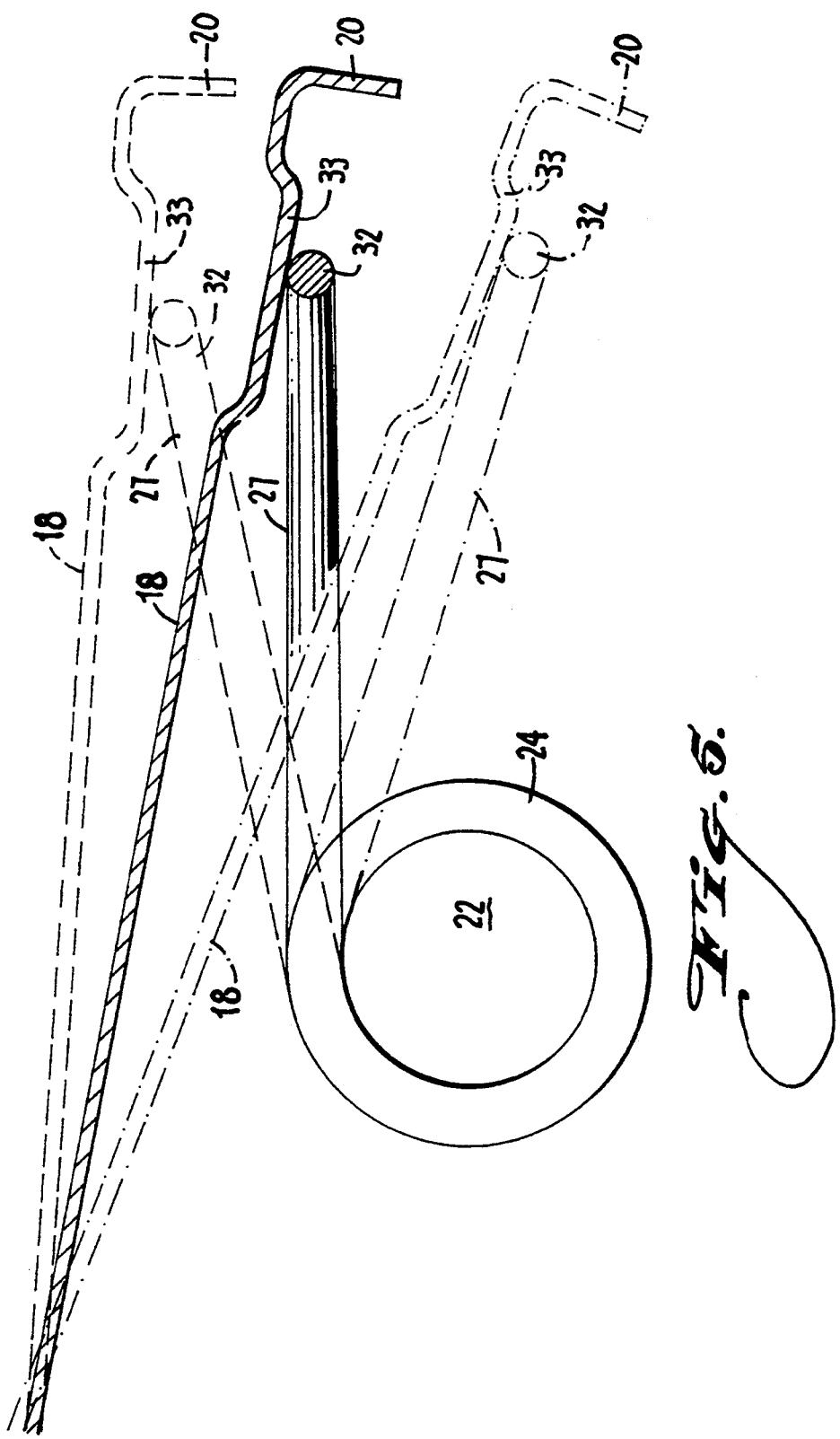

CHAIR CONTROL

BACKGROUND OF THE INVENTION

This invention relates to a tilt control mechanism for a chair. It relates particularly to a knee tilt control mechanism for a pedestal type of office chair.

Chair controls are mechanical devices usually mounted beneath the seat of a chair to control the tilting of a chair when a user leans back in the chair. The control mechanism usually comprises a chair control housing adapted to be mounted on a support column attached to the chair pedestal base and a chair seat support member or plate secured to the underside of the chair seat and pivotally mounted to the chair control housing. There is usually a spring or other energy storing device attached to the chair control housing which controls the rate at which the user can tilt the chair rearwardly and which returns the chair to its upright at-rest position when the user stops leaning backward.

Many of the previously known chair controls have been pivoted at a point very near the center line of the chair control housing, which usually also coincides with the center of gravity of the user seated in the chair. As a result, the tilting of the chair backwards requires very little force, but raises the front of the chair seat, creating pressure on the back of the thighs and disturbing the blood circulation of the user. These chair controls also require the user to exert considerable force through an extension of the leg and foot to maintain a tilted position for this type of chair. The result is not relaxing to the user.

More recently there have been developed knee tilt chair controls. The knee tilt chair controls function to pivot the chair seat support member or plate as near to the natural knee joint of the user as possible so that the front of the seat rises very little or not at all during the rearward tilting of the chair. With a larger portion of the user's weight positioned behind the control pivot point, little or no effort is required to recline the chair or maintain the chair in a reclined position and the feet of the user can remain flat on the floor with little effort. Some of the known knee tilt chairs reclined so easily that the user often had the feeling that the chair was falling backwards.

The knee tilt control chairs, as compared to the traditional controlled chairs, generally require a much greater force to support the user on the extended moment arm and to return the reclined user to an upright position. Springs providing such force tend to become quite large and bulky to balance the weight of the user and to return the reclining user to an upright position.

To make the most effective use of the springs used to balance the weight of the user and to return the reclined user to an upright position, the vertical force component produced by the spring should be as large as possible for all tilt positions of the chair. In the knee tilt control chair designs known prior to this invention, the spring was not being used effectively since the rate of increase of the vertical force component decreased as the chair reclined. This is because the size or magnitude of the vertical force component is a function of both the amount of torque developed by the spring and the angle of contact between the lever arm of the spring and the underside of the seat support member or plate.

SUMMARY OF THE INVENTION

It is therefore an object of this invention to provide a control mechanism for a knee tilt chair that allows the user to recline the chair into various positions without the using excessive force by the legs and feet of the user.

It is another object of this invention to provide a control mechanism for a knee tilt chair that allows the user to recline the chair into various positions without the feeling that the chair is falling backwards.

It is a still further object of this invention to provide a control mechanism for a knee tilt chair that greatly increases the efficiency of the spring used to balance the weight of the user and to return the reclined user to an upright position.

It has been discovered that the foregoing objects can be attained by a chair tilt control mechanism for a pedestal base chair comprising a chair control housing mounted on the pedestal chair base and pivotally supporting a chair seat support member having a cam surface formed along a portion of the bottom surface thereof. A torsion spring is secured to the chair control housing and is adapted to resist the pivotal movement of the chair seat support member. The torsion spring has a lever arm that is adapted to contact and move along the cam surface during the pivotal movement of the chair seat support member and thereby make a more effective use of the torsion spring and a chair more comfortable to the user.

BRIEF DESCRIPTION OF THE DRAWINGS

FIG. 5 is a partial sectional view similar to FIG. 2 to illustrate a fourth embodiment of this invention.

DESCRIPTION OF THE PREFERRED EMBODIMENTS

Figure 1:
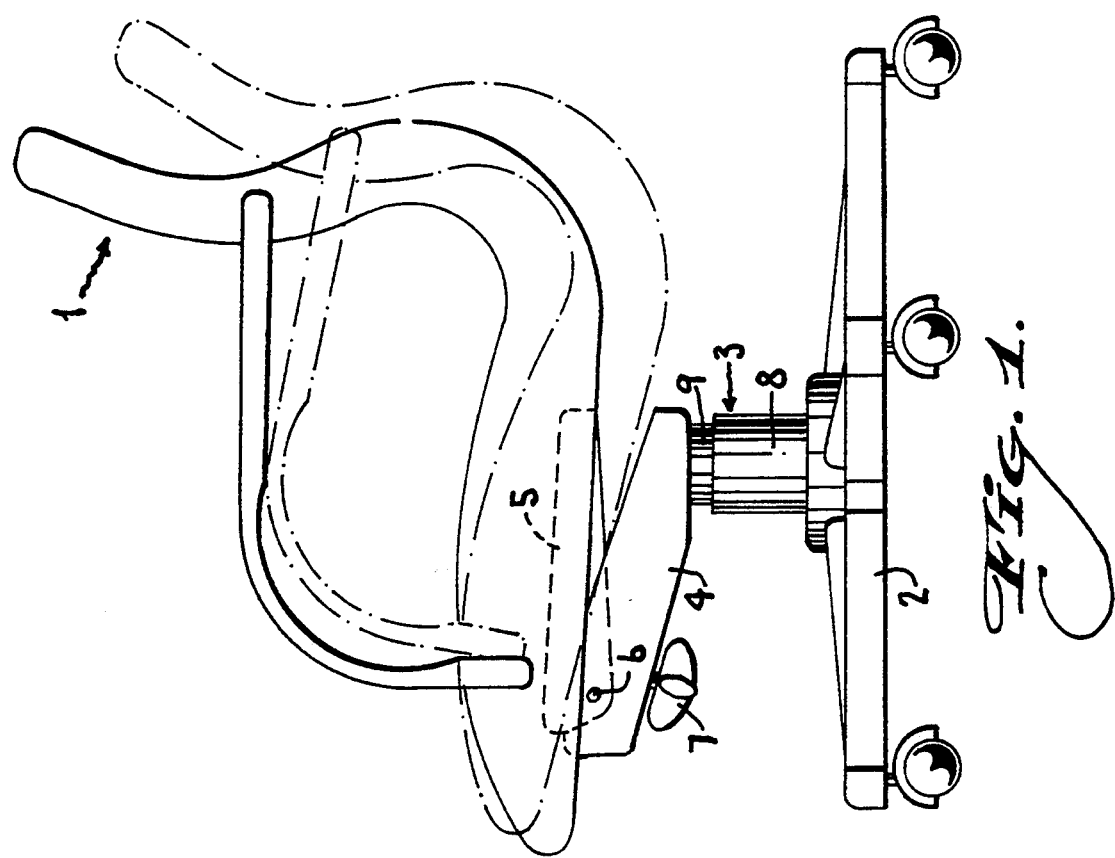
FIG. 1 is a side elevational view of a pedestal type of office chair with the knee tilt control mechanism of this invention.

FIG. 1 illustrates a side elevational view of a typical knee tilt control office chair 1 having a base 2, a gas cylinder height adjustment and support 3, a chair control housing 4 and a tiltable chair seat support member 5 pivotally connected to the chair control housing 4 by pins 6. The chair control housing 4 is provided with a tension adjustment knob 7 for adjusting the tension on a torsion spring that controls the rate at which the user can tilt the chair seat and chair seat support member 5 about the pins 6 and which returns the chair 1 to an upright, at-rest position when the user stops leaning backwards.

Figure 2:
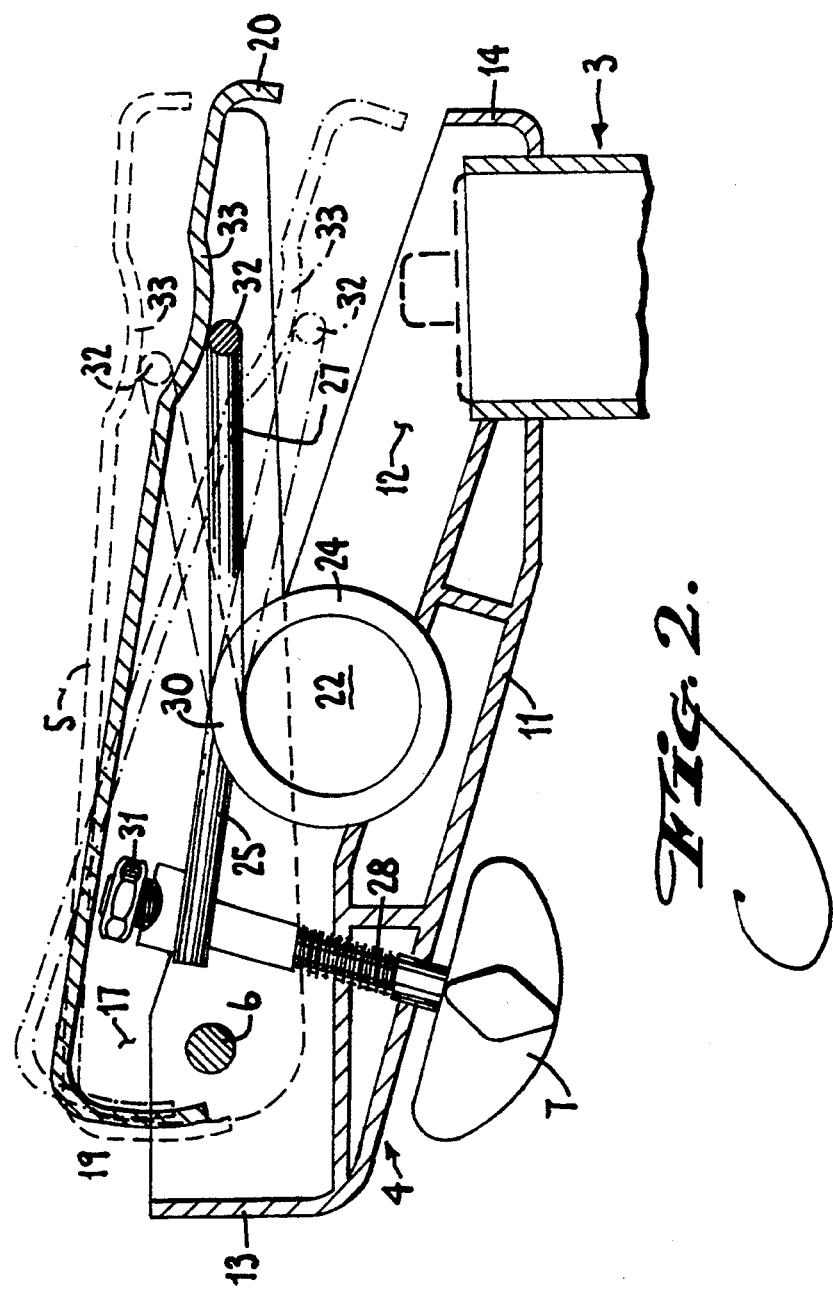
FIG. 2 is a sectional side elevation view of the knee tilt control mechanism of this invention with the chair seat support member shown in three different positions of tilt.

FIG. 2 illustrates a sectional side elevation view of the knee tilt control mechanism of this invention with the chair seat support member 5 shown in three different positions of tilt. The knee tilt control mechanism is contained essentially in the chair control housing 4 attached to and supported by a pneumatic type adjustable gas cylinder 3. If desired, a mechanical support may be used. The pneumatic gas cylinder 3 used in this embodiment includes an outer cylinder 8 attached to the pedestal base 2, and an inner cylinder 9 which moves up or down to position the chair seat at the proper height. The movement up or down of the inner cylinder 9 of the pneumatic support column is controlled by a handle (not shown).

As shown in FIG. 2, the chair control housing 4 is made of metal, either die cast or stamped, and is comprised essentially of a bottom portion 11, a pair of upstanding parallel side wall portions 12, and a short upstanding front wall 13 and back wall 14. The upstanding parallel side wall portions 12 are each provided with openings to receive pivot pins 6 which pass through the side wall portions 12 and into aligned openings provided in the downwardly facing parallel side portions 17 of the chair seat support member 5. The pivot pins 6 provide points about which the chair seat support member 5 pivots relative to the chair control housing 4 and provide the tilting of the chair 1.

As shown in FIG. 2, the chair seat support member 5 comprises essentially an upper flat metal plate portion 18 which supports and is attached to the underside of the padded and upholstered seat of the chair 1. In this embodiment, the chair seat support member 5 is provided with front and rear stiffening flanges 19 and 20, which also serve as front and rear tilt stops.

Mounted horizontally between the sidewalls 12 of the chair control housing 4 is a spring support sleeve 22. Surrounding the spring support sleeve 22 is a double coil torsion spring 30 comprised of double spring coils 24, a pair of forward extending legs 25 and a rearwardly extending lever arm 27 that is connected to both spring coils 24.

As shown in FIGS. 2, the tension adjustment knob 7 is attached to a tension screw 28 that passes through an opening in the the front of the bottom portion 11 of the chair control housing 4 and up between the forward extending legs 25 of the double torsion spring 30. A threaded nut and washer assembly 31 is fastened on the leading end of the tension screw 28 on top of the forward extending legs 25. Turning the tension adjustment knob 7 will increase or decrease the initial tension in the double torsion spring 30, as desired.

In the chair tilt control of this invention, the rear end 32 of the rearwardly extending lever arm 27 is adapted to contact and move along a cam surface 33 formed along a portion of the bottom surface of the chair seat support member 5 during the tilting of the chair 1, as illustrated for three chair tilt positions in FIG. 2. The cam surface 33 as shown in the embodiment illustrated in FIG. 2 is curved convex in shape relative to the end 32 of the lever arm 27 and is preferably pressed to shape during the fabrication of the chair seat support member 5 but may be a separate piece welded or otherwise secured to the underside of the chair seat support member 5. If desired, the cam surface 33, may be a separate piece that is not only secured to the underside of the chair seat support member 5 but made to be adjustable in a front to back direction or in an up and down direction to provide the desired contact surface for the end 32 of the spring lever arm 27.

The cam surface 33 essentially programs the torsional response of the spring 30. The configuration of the cam surface 33 causes the end 32 of the spring lever arm 27 to move up or down causing the spring 30 to be more or less compressed. As the chair 1 is reclined by a user, the end 32 of the spring lever arm 27 moves and follows the cam surface 33, as illustrated in FIGS. 2–5. The cam surface 33 will also tend to stiffen and strengthen the upper flat plate portion 18 of the chair support member 5, especially if the cam surface 33 is pressed into shape during the fabrication of the chair seat support member 50

Figure 3:
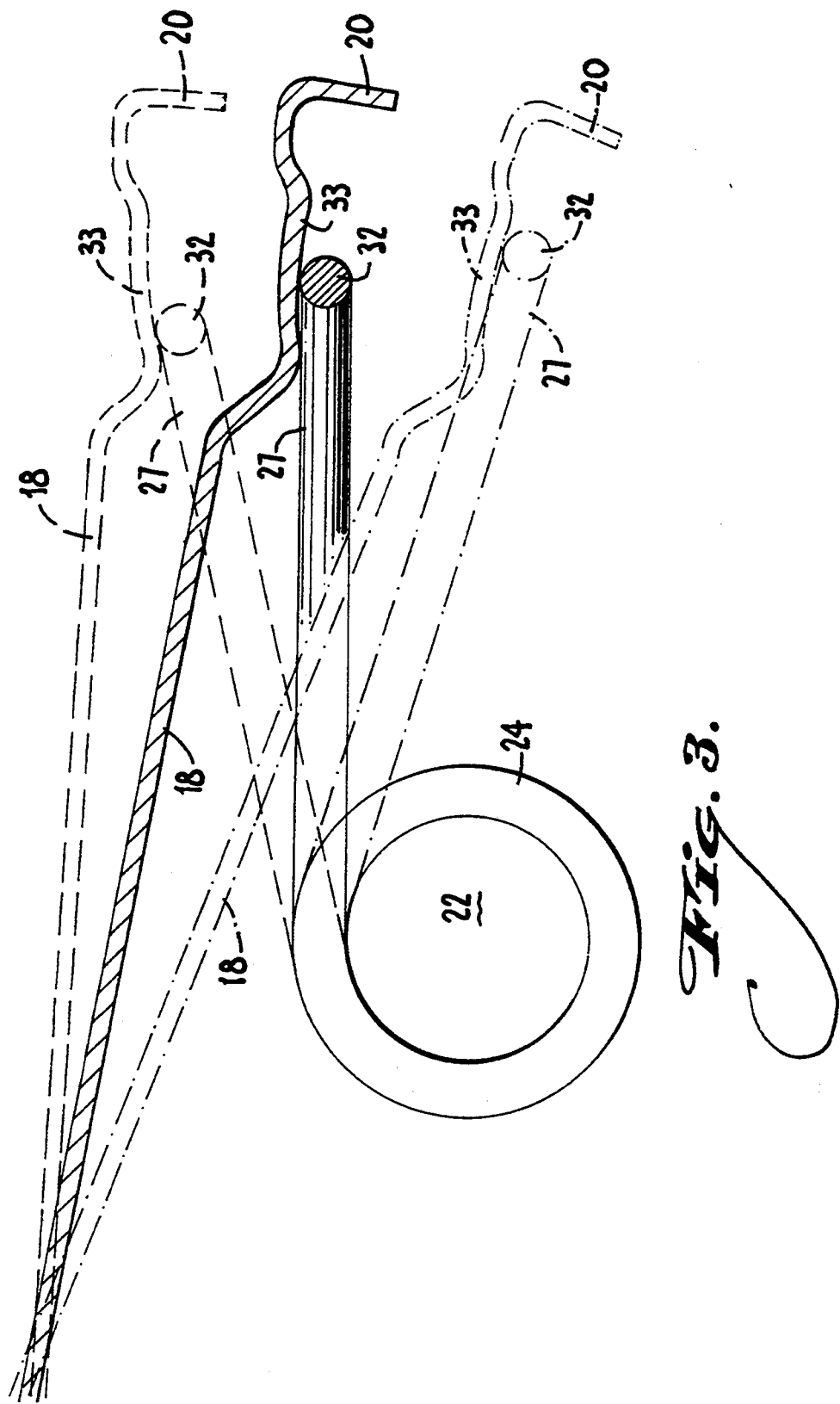
FIG. 3 is a partial sectional view similar to FIG. 2 to illustrate a second embodiment of this invention.
Figure 4:
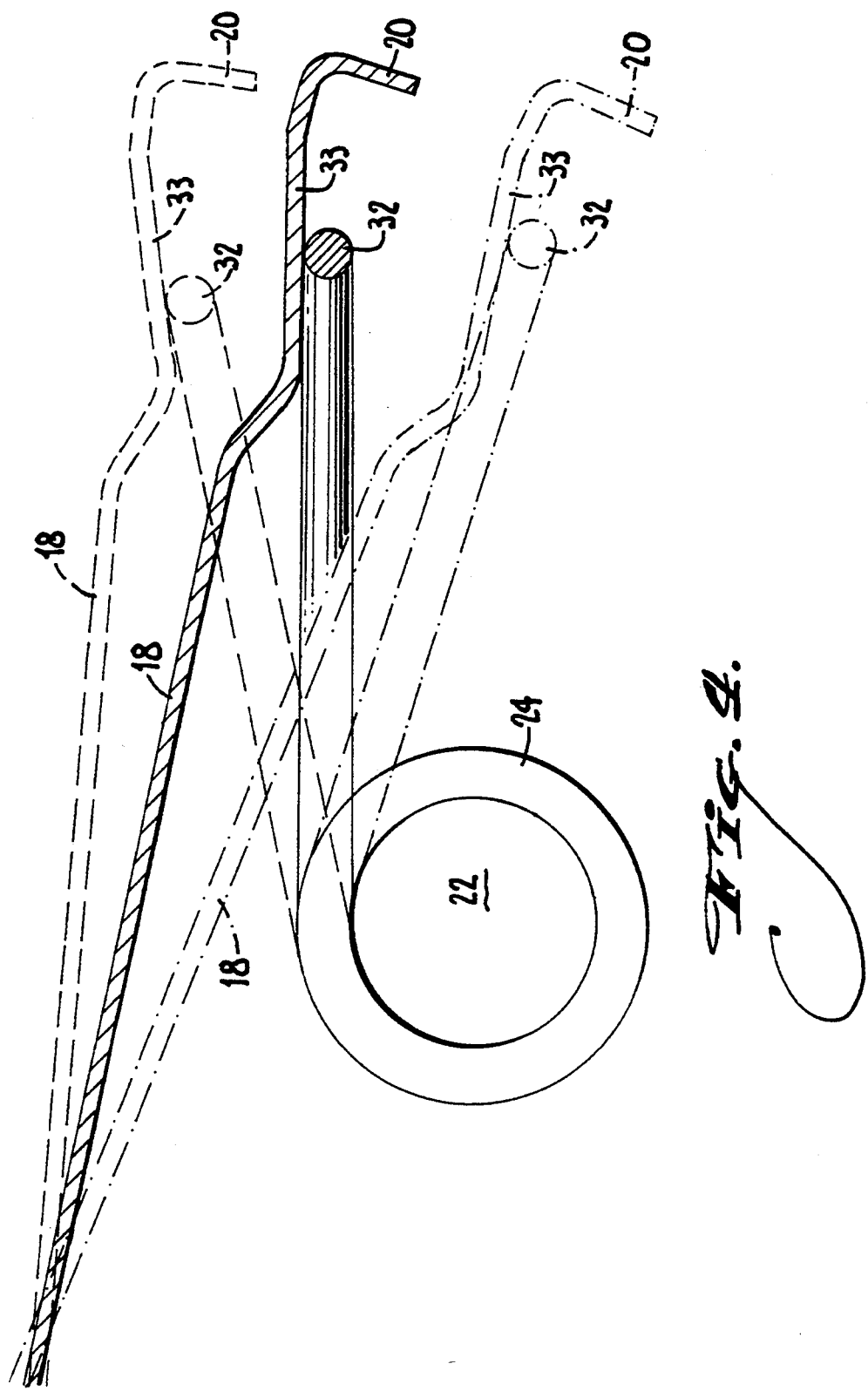
FIG. 4 is a partial sectional view similar to FIG. 2 to illustrate a third embodiment of this invention.

FIGS. 3–5, which are partial sectional views similar to FIG. 2, illustrate three different embodiments of the cam surface for use in the chair control of this invention. FIG. 3 illustrates a convexly curved cam surface which includes a concave portion 33 relative to the end 32 of the spring lever arm 27. FIG. 4 illustrates an inclined planar cam surface 33. FIG. 5 illustrates a planar cam surface 33 that is parallel to but spaced below the surface of the upper flat plate portion 18 of the chair seat support member 5. FIGS. 3–5 show three chair tilt positions for each embodiment to illustrate the movement of the end 32 of the spring lever arm 27 during the tilting of the chair 1. FIGS. 2–5 illustrate just several of the cam surface configurations possible within the scope of this invention. As indicated above, if desired the cam surface can be made to be adjustable or it may be composed of two or more convexly or concavely curved surfaces such as shown in FIG. 3.

By selecting a specific shape and size of the cam surface 33, the angle of contact between the end 32 of the spring lever arm 27 can be gradually changed and carefully controlled during the tilting of the chair, thereby automatically changing the torsional response of the spring 30 during the tilting of the chair by the user to provide the desired restoring force to the chair seat and increase the efficiency of the spring 30.

While I have described this invention by illustrating and describing the preferred embodiments of it, I have done this by way of example, and am not to be limited thereby as there are modifications and adaptions of these embodiments that could be made within the scope of this invention.

I claim:

1. A chair, comprising:
    a base including a chair seat control housing mounted thereon, said housing having a spring support around which is disposed a torsion spring, said torsion spring having a first leg and a second leg fixedly attached to said housing; and
    a chair seat including an integrally connected bottom plate having two side plates connected thereto wherein said two side plates are pivotally connected to said chair seat control housing, said bottom plate further having a downwardly extending cam surface;
    wherein said first leg of said torsion spring slidably engages said cam surface during pivotal movement of said chair seat.

2. The chair as recited in claim 1, wherein said cam surface is substantially convex in shape.

3. The chair as recited in claim 1, wherein said cam surface is a plane parallel to but spaced from said bottom plate.

4. The chair as recited in claim 1, wherein said cam surface comprises at least one substantially convex portion and at least one substantially concave portion.

5. A chair, comprising:
    a base including a chair seat control housing mounted thereon, said housing having a spring support around which is disposed a torsion spring, said torsion spring having a first leg and a second leg, said housing further having a torsion adjusting means to which said second leg is fixedly attached for changing the fixed position of said second leg relative to said first leg; and a chair seat including an integrally connected bottom plate having two side plates connected thereto wherein said two side plates are pivotally connected to said chair seat control housing, said bottom plate further having a downwardly extending, substantially convex cam surface;

wherein said first leg of said torsion spring slidably engages said cam surface during pivotal movement of said chair seat.

* * * * *